(12) United States Patent
Tanaka et al.

(10) Patent No.: US 10,995,680 B2
(45) Date of Patent: May 4, 2021

(54) SEALING MEMBER AND AIR INTAKE CONTROLLER

(71) Applicant: KEIHIN CORPORATION, Tokyo (JP)

(72) Inventors: Satoshi Tanaka, Tochigi (JP); Soichiro Nao, Tochigi (JP); Kazusa Sato, Tochigi (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 15/938,541

(22) Filed: Mar. 28, 2018

(65) Prior Publication Data
US 2018/0283289 A1 Oct. 4, 2018

(30) Foreign Application Priority Data

Mar. 30, 2017 (JP) .............................. JP2017-068634

(51) Int. Cl.
*F16J 15/3236* (2016.01)
*F02D 9/10* (2006.01)
(Continued)

(52) U.S. Cl.
CPC .......... *F02D 9/106* (2013.01); *F16J 15/3204* (2013.01); *F16J 15/3236* (2013.01);
(Continued)

(58) Field of Classification Search
CPC .... F16K 1/2078; F16K 1/2268; F16K 5/0285; F16K 5/0485; F16K 5/0694;
(Continued)

(56) References Cited

U.S. PATENT DOCUMENTS 5,833,245 A * 11/1998 Gallagher ............ F16J 15/3236
277/549
6,029,979 A * 2/2000 Grosspietsch ....... F16J 15/3236
277/434
(Continued)

FOREIGN PATENT DOCUMENTS

DE 2112851 A1 * 9/1972 ........... F16J 15/3236
JP 04-191571 A 7/1992
(Continued)

OTHER PUBLICATIONS

Office Action dated May 15, 2018 issued in corresponding Japanese patent application 2017-068634.

*Primary Examiner* — Hailey K Do
(74) *Attorney, Agent, or Firm* — Carrier Blackman & Associates, P.C.; Joseph P. Carrier; Jeffrey T. Gedeon (57) ABSTRACT

A sealing member and an air intake controller are disclosed herein. The sealing member includes an inner cylindrical section having a gradually-decreasing-diameter portion which has a diameter that gradually decreases in one direction, an outer cylindrical section having a gradually-increasing-diameter portion which has a diameter that gradually increases in the one direction, and an annular connecting section which connects the inner cylindrical section and the outer cylindrical section at an end portion on the side in the opposite direction from the one direction. The outer cylindrical section has an extended cylindrical portion, the outer diameter of which gradually decreases in the one direction. An air intake controller can incorporate the sealing member that is disclosed herein between a shaft hole 1 and a valve shaft.

3 Claims, 3 Drawing Sheets

(51) Int. Cl.
*F16J 15/3204* (2016.01)
*F16K 1/226* (2006.01)
*F16K 37/00* (2006.01)

(52) U.S. Cl.
CPC .......... *F16K 1/2268* (2013.01); *F16K 37/005* (2013.01); *F02D 9/1065* (2013.01); *F02D 2200/0404* (2013.01); *F02D 2200/0414* (2013.01)

(58) Field of Classification Search
CPC ...... F16K 41/003; F16K 41/02; F16K 41/023; F16K 41/026; F16K 41/04; F16K 41/043; F16K 41/046; F16K 41/06; F16K 41/063; F16K 41/066; F16K 41/08; F16K 41/083; F16K 41/086; F16K 41/106; F02D 9/106; F02B 27/0273; F02B 27/0284; F02M 26/70; F16J 15/3236; F16J 15/3216; F16J 15/3232; F16J 15/3204; F16J 9/02; F16J 9/069; F16J 9/20; F16C 33/743
See application file for complete search history.

(56) References Cited

U.S. PATENT DOCUMENTS 6,189,894 B1 * 2/2001 Wheeler .............. F16J 15/3236
  277/549
2008/0216794 A1 * 9/2008 Kuji ........................ F02D 9/106
  123/336

FOREIGN PATENT DOCUMENTS

JP  2013238275 A * 11/2013 ............. F16J 15/164
JP  2015-172365 A  10/2015

* cited by examiner

SEALING MEMBER AND AIR INTAKE CONTROLLER

BACKGROUND OF THE INVENTION

Field of the Invention

The present invention relates to a sealing member for airtightly sealing the gap between a shaft and a shaft hole, and an air intake controller that uses the sealing member.

Description of the Related Art

Hitherto, as an air intake controller that controls the air intake of an internal combustion engine, there has been known an air intake controller that has a throttle body, which is a main body having an intake passage formed therein, a throttle valve for opening/closing the intake passage, and a valve shaft to which the throttle valve is fixed and which is rotatably supported by two shaft holes provided in the throttle body (refer to, for example, Patent Document 1).

In the air intake controller described in Patent Document 1, a sealing member is provided between each shaft hole and a valve shaft. The sealing member between one of the shaft holes and the valve shaft is installed in a groove provided in the inner periphery of an end portion of the shaft hole on the outer side of the controller, while the sealing member between the other of the shaft holes and the valve shaft is installed in a groove in the outer periphery of the valve shaft.

The valve shaft projects out of a main body from the one shaft hole, and a throttle lever is connected to the projecting portion. When a throttle grip of a motorcycle provided with the air intake controller is operated, the throttle lever is rotated through an operating wire, thus opening/closing the throttle valve.

Patent Document 1: Japanese Patent Application Laid-Open No. 2015-172365

According to the air intake controller described in the foregoing Patent Document 1, the valve shaft projecting out of the main body through the foregoing one shaft hole is pulled in one direction perpendicular to the valve shaft by the operating wire, so that the sliding surface between the shaft hole and the valve shaft is required to exhibit high durability.

Normally, the pressure outside the throttle body is higher than that in the intake passage. If, therefore, the gap between the shaft hole and the valve shaft fails to be hermetically sealed, then dust is apt to enter into the gap. The valve shaft is directly supported by the sliding surface of the shaft hole, so that the entry of dust into the gap between the sliding surface and the valve shaft may adversely affect smooth rotation of the valve shaft. For this reason, a sealing member between the valve shaft and the one shaft hole is required to provide high sealing performance with respect to the outside of the controller.

SUMMARY OF THE INVENTION

In order to minimize rotational resistance while securing the high sealing performance, a U packing or the like is used. However, when inserting the valve shaft in a shaft hole, the lip portion of the packing interferes with the insertion in some cases, thus placing restrictions on the insertion direction of the valve shaft or the placement of sealing members, resulting in a low degree of design freedom.

In view of the problem with the prior art described above, an object of the present invention is to provide a sealing member that can be easily installed in the gap between a shaft, such as a valve shaft, and a shaft hole thereby to provide high sealing performance, and an air intake controller using the sealing member.

A sealing member according to a first aspect of the invention is a sealing member which is installed in a sealing groove provided in an outer periphery of a shaft and which airtightly seals a gap between the shaft inserted in a shaft hole and the shaft hole, the sealing member including:

an inner cylindrical section having a gradually-decreasing-diameter portion which has the diameter thereof gradually decreasing in one direction;

an outer cylindrical section having a gradually-increasing-diameter portion which has the diameter thereof gradually increasing in the one direction; and an annular connecting section which interconnects the inner cylindrical section and the outer cylindrical section at end portions thereof on an opposite direction side from the one direction, wherein the outer cylindrical section includes an extended cylindrical portion which extends in the one direction from an end portion of the gradually-increasing-diameter portion on the one direction side, and an outer diameter of the extended cylindrical portion gradually decreases in the one direction.

According to the first aspect of the invention, the outer diameter of the extended cylindrical portion in the outer cylindrical section of the sealing member gradually decreases in the foregoing one direction, i.e. the direction toward the distal end of the extended cylindrical portion from the proximal end thereof. With this arrangement, even if the sealing member is installed in the sealing groove of the shaft such that the direction in which the diameter of the gradually-increasing-diameter portion gradually increases (i.e. the foregoing one direction) coincides with the direction in which the shaft is inserted in the shaft hole, the shaft with the sealing member installed thereto can be easily inserted in the shaft hole.

In other words, at the time of the insertion, in the case where the minimum outer diameter of the extended cylindrical portion of the sealing member is slightly larger than the inner diameter of the shaft hole, the shall can be inserted to an intended position while avoiding the distal end of the extended cylindrical portion interfering with the end portion of the shaft hole by pushing the distal end into the sealing groove. In other words, once the distal end of the extended cylindrical portion is placed in the shaft hole, the shaft can be inserted by the smooth sliding of the outer surface of the extended cylindrical portion along the inner surface of the shaft hole, since the outer diameter of the extended cylindrical portion gradually decreases in the insertion direction. If the minimum outer diameter of the extended cylindrical portion is smaller than the inner diameter of the shaft hole, then the shaft can be directly inserted into the shaft hole without the need for paying attention to the distal end of the extended cylindrical portion.

Meanwhile, if the sealing member is installed in the sealing groove of the shaft such that the direction in which the diameter of the gradually-increasing-diameter portion gradually increases (i.e. the foregoing one direction) is opposite from the direction in which the shaft is inserted in the shaft hole, then the distal end of the extended cylindrical portion will not interfere with the end portion of the shaft hole, thus enabling the shaft with the sealing member installed thereto to be easily inserted in the shaft hole.

Hence, regardless of the direction in which the sealing member is installed with respect to the shaft, the sealing member having the foregoing configuration can be easily installed between the shaft and the shaft hole to satisfactorily seal the gap between the shaft and the shaft hole.

In the sealing member according to a second aspect of the invention, a minimum outer diameter of the extended cylindrical portion is smaller than the inner diameter of the shaft hole in the first aspect of the invention.

According to the second aspect of the invention, when inserting the shaft into the shaft hole, even if the sealing member is installed in the sealing groove of the shaft such that the foregoing one direction (i.e. the direction in which the diameter of the gradually-increasing-diameter portion gradually increases) coincides with the insertion direction of the shaft, the distal end of the extended cylindrical portion will not interfere with the end portion of the shaft hole, thus enabling the shaft with the sealing member installed thereto to be inserted in the shaft hole with even greater ease.

An air intake controller according to a third aspect of the invention is an air intake controller that controls the air intake of an internal combustion engine, including:
- a main body having an intake passage formed therein;
- a throttle valve for opening/closing the intake passage;
- a valve shaft which is rotatably supported by two shaft holes provided in the main body and to which the throttle valve is fixed; and
- the sealing member according to the first aspect of the invention, which airtightly seals a gap between the shaft hole and the valve shaft.

According to the third aspect of the invention, when installing the valve shaft to the shaft holes of the main body, the valve shaft can be easily inserted into the shaft holes from any direction to install the sealing member between the valve shaft and the shaft holes regardless of the installation direction of the sealing member with respect to the valve shaft. Thus, high airtightness with respect to one or both of the intake passage and the outside of the main body can be easily secured.

In the third aspect of the invention, in an air intake controller according to a fourth aspect,
- at least one of the two shaft holes has a sliding surface that slidably and rotatably supports the valve shaft,
- the valve shaft has a sliding cylindrical section slidably rotates with respect to the sliding surface, and
- a gap between the sliding surface and the sliding cylindrical section is airtightly sealed on both sides in the direction of central axes of the sliding surface and the sliding cylindrical section, at least one of both sides being sealed by the sealing member according to the first aspect of the invention.

According to the fourth aspect of the invention, the sealing member according to the first aspect of the invention can be easily installed between the valve shaft and the shaft hole regardless of the installation direction with respect to the valve shaft. Therefore, by using the sealing member according to the first aspect of the invention for at least one of the sliding surface and the sliding cylindrical section, the sealing member on the one of the sliding surface and the sliding cylindrical section can be installed to the valve shaft, with the sealing member on the other of the sliding surface and the sliding cylindrical section being set in a direction in which the sealing member can be inserted in the shaft hole.

Thus, even when the sealing member according to the first aspect of the invention is used in combination with another sealing member, each of the sealing members can be installed to the valve shaft and inserted in the shaft hole in a direction that minimizes the possibility of dust, carbon particles or the like entering between the sliding surface and the sliding cylindrical section, thus preventing the wear damage to the sliding surface and the sliding cylindrical section.

DESCRIPTION OF THE PREFERRED EMBODIMENTS

The following will describe an embodiment of the present invention with reference to the accompanying drawings. The sealing member according to the embodiment is a sealing member to be installed in a sealing groove provided in the outer periphery of a shaft to airtightly seal the gap between a shaft inserted in a shaft hole and the shaft hole.

Figure 1:
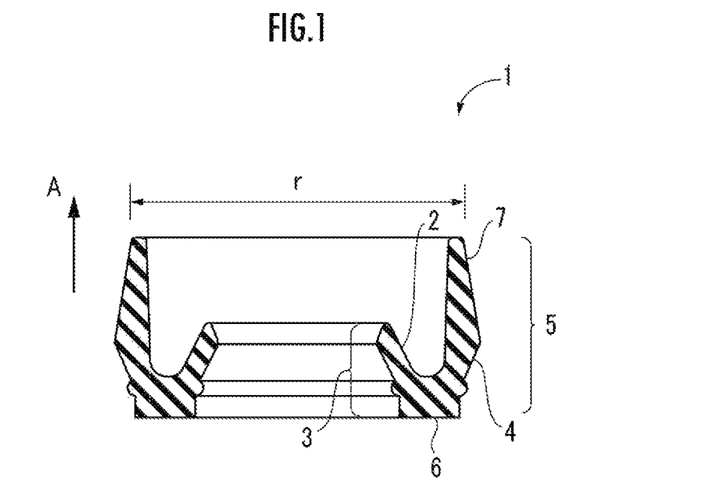
FIG. 1 is a sectional view of a sealing member according to an embodiment of the present invention.

As illustrated in FIG. 1, a sealing member 1 includes an inner cylindrical section 3, which has a gradually-decreasing-diameter portion 2 having the diameter thereof gradually decreasing in one direction (namely, a direction A in the drawing (hereinafter referred to as "the A-direction")), an outer cylindrical section 5, which has a gradually-increasing-diameter portion 4 having the diameter thereof gradually increasing in the A-direction, and an annular connecting section 6, which interconnects the inner cylindrical section 3 and the outer cylindrical section 5 at an end on the opposite side from the A-direction.

More specifically, the sealing member 1 is a type of lip packing. When the air pressure on the A-direction side is higher than that on the opposite side therefrom, the inner cylindrical section 3 comes in closer contact with the shaft than it does in the opposite case, and the outer cylindrical section 5 comes in closer contact with the shaft hole, thus providing higher sealing performance.

The outer cylindrical section 5 has an extended cylindrical portion 7, which extends in the A-direction from an end of the gradually-increasing-diameter portion 4, the end being on the A-direction side. The outer diameter of the extended cylindrical portion 7 gradually decreases in the A-direction.

Figure 2:
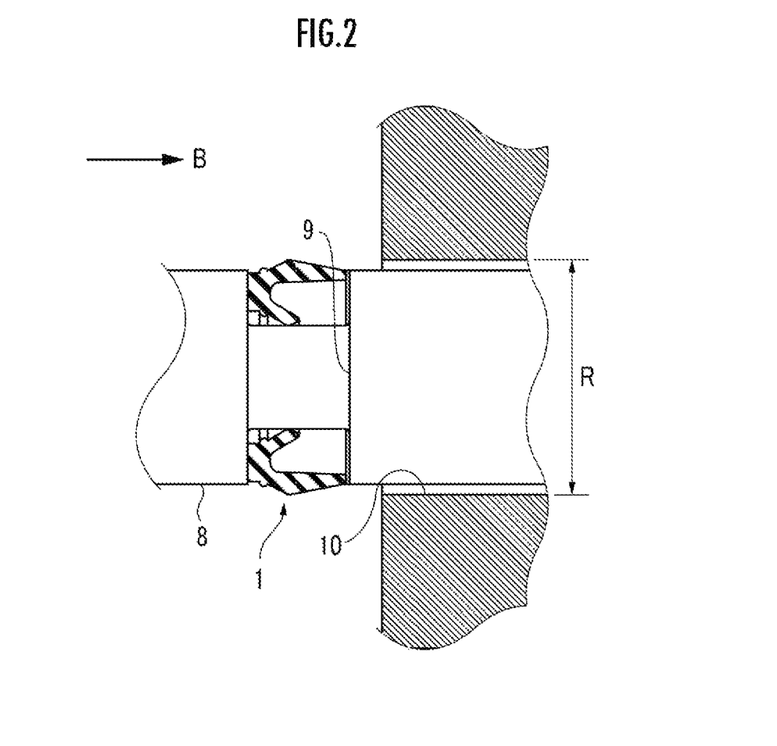
FIG. 2 is a sectional dew illustrating the sealing member in FIG. 1 being installed.

FIG. 2 illustrates the sealing member 1 being installed in a sealing groove 9 of a shaft 8 and then the shaft 8 being inserted in a shaft hole 10 thereby to install the sealing member 1 between the shaft 8 and the shaft hole 10. As illustrated in FIG. 1 and FIG. 2, a minimum outer diameter (i.e. the outer diameter of the distal end) r of the extended cylindrical portion 7 is smaller than an inner diameter R of the shaft hole 10.

In the case where the minimum outer diameter r of the extended cylindrical portion 7 is equal to or more than the inner diameter R of the shaft hole 10, the shaft 8 can be inserted in the shaft hole 10 by pushing the distal end of the extended cylindrical portion 7 into the sealing groove 9 by making use of the elastic deformation of the sealing member 1.

To install the sealing member 1 between the shaft 8 and the shaft hole 10, the shaft 8 with the sealing member 1 installed in the sealing groove 9 is inserted in the shaft hole 10 in a predetermined B-direction, as illustrated in FIG. 2.

At this time, as illustrated in FIG. 2, even when the sealing member 1 is installed in the sealing groove 9 of the shaft 8 such that the A-direction, in which the diameter of the gradually-increasing-diameter portion 4 gradually increases coincides with the B-direction, in which the shaft 8 is inserted in the shaft hole 10, the shaft 8 will be easily inserted to an intended position by the smooth sliding of the outer surface of the extended cylindrical portion 7 along the inner surface of the shaft hole 10, since the outer diameter of the extended cylindrical portion 7 gradually decreases in the A-direction.

Further, at this time, in the case where the minimum outer diameter r of the extended cylindrical portion 7 of the sealing member 1 is equal to or larger than the inner diameter R of the shaft hole 10, the shaft 8 is inserted in the shaft hole 10 by pushing the distal end of the extended cylindrical portion 7 into the sealing groove 9 of the shaft 8 while preventing the distal end from interfering with the end portion of the shaft hole 10. Once the distal end of the extended cylindrical portion 7 is placed in the shaft hole 10, the shaft 8 is easily inserted to the intended position thereafter in the same manner.

Meanwhile, in the case where the sealing member 1 is installed in the sealing groove 9 of the shaft 8 such that the A-direction, in which the diameter of the gradually-increasing-diameter portion 4 gradually increases and the B-direction, in which the shaft 8 is inserted in the shaft hole 10, are opposite from each other, the distal end of the extended cylindrical portion 7 will not interfere with the end portion of the shaft hole 10. Hence, the shaft 8 with the sealing member 1 installed thereto is easily inserted in the shaft hole 10.

Thus, the sealing member 1 is easily installed between the shaft 8 and the shaft hole 10 to satisfactorily seal the gap between the shaft 8 and the shaft hole 10 regardless whether the direction in which the sealing member 1 is installed to the shaft 8 is the direction in which the A-direction coincides with the B-direction.

Figure 3:
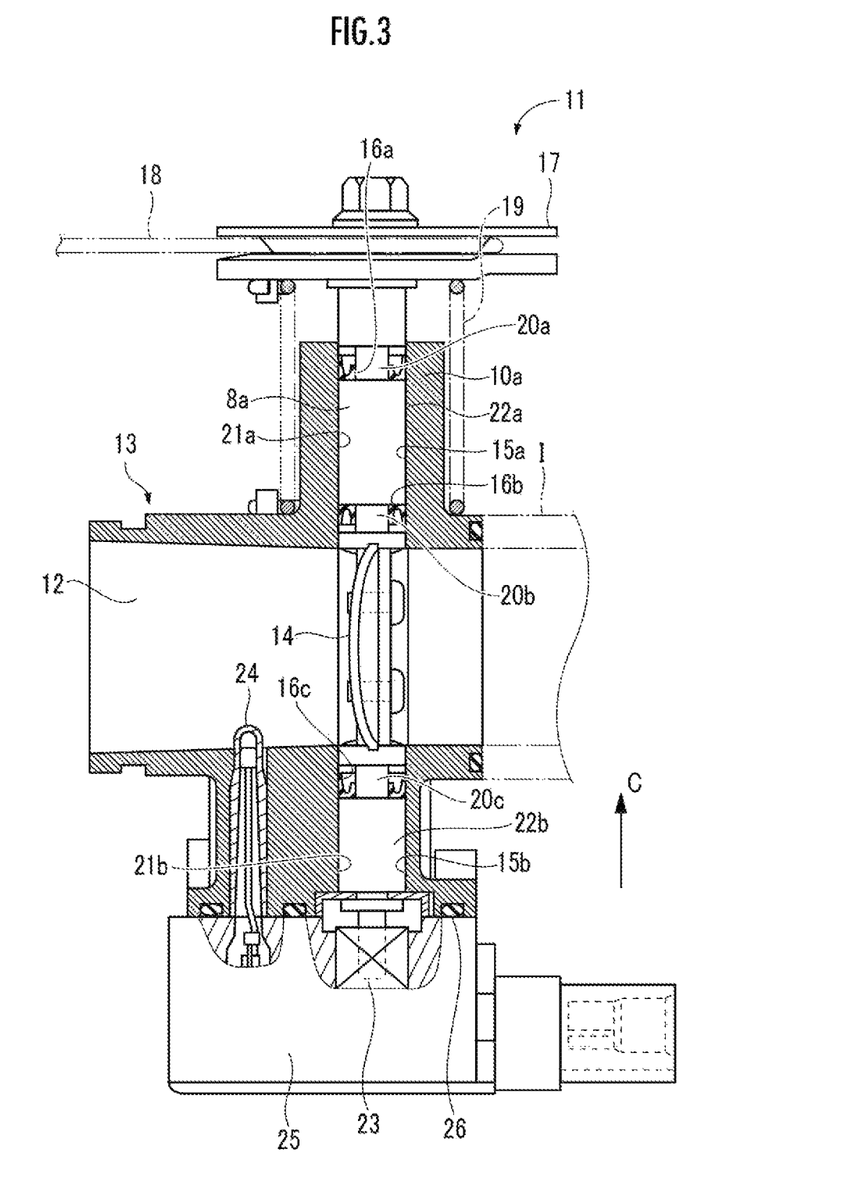
FIG. 3 is a partial sectional view illustrating the section of an essential part of an air intake controller to which the sealing member in FIG. 1 has been installed.

FIG. 3 illustrates an example of an air intake controller to which the sealing member 1 has been applied. The air intake controller controls the intake air to be fed to an internal combustion engine.

As illustrated in FIG. 3, an air intake controller 11 includes a throttle body 13 serving as the main body with an intake passage 12 formed therein, a throttle valve 14 for opening/closing the intake passage 12, a valve shaft 8a which is rotatably supported by two shaft holes 15a and 15b provided in the throttle body 13 and to which the throttle valve 14 is fixed, and sealing members 16a to 16c, which airtightly seal the gap between the shaft holes 15a, 15b and the valve shaft 8a.

The shaft hole 15a is formed as a communication hole that is in communication with the outside of the throttle body 13. A drum-type throttle lever 17 is fixed to the end portion of the valve shaft 8a, which projects out of the throttle body 13 through the shaft hole 15a.

A wire 18, which is operated by a throttle grip (not illustrated), is connected to the throttle lever 17. A return spring 10, which urges the throttle lever 17 in the closing direction of the throttle valve 14, is interposed between the throttle body 13 and the throttle lever 17. With this arrangement, the throttle valve 14 is opened or closed to set a degree of opening based on the manipulated variable of the throttle grip operated against the urging force.

The gap between the shaft hole 15a and the valve shaft 8a is airtightly sealed by the sealing member 16a adjacent to the throttle lever 17 and the sealing member 16b adjacent to the intake passage 12. The gap between the shaft hole 15b and the valve shaft 8a is airtightly sealed by the sealing member 16c. The sealing members 16a and 16c are the same as the sealing member 1 illustrated in FIG. 1.

The sealing member 16b is the same as the sealing member 1 illustrated in FIG. 1 except that the sealing member 16b does not have the extended cylindrical portion 7. More specifically, the sealing member 16b is the same as the sealing member 1 in that the sealing member 16b includes an inner cylindrical section 3, which has a gradually-decreasing-diameter portion 2 having the diameter thereof gradually decreasing in the A-direction, an outer cylindrical section 5, which has a gradually-increasing-diameter portion 4 having the diameter thereof gradually increasing in the A-direction (but does not have the extended cylindrical portion 7), and an annular connecting section 6, which interconnects the inner cylindrical section 3 and the outer cylindrical section 5 at an end on the opposite side from the A-direction.

The valve shaft 8a has a sealing groove 20a, to which the sealing member 16a has been installed, on the throttle lever 17 side of a portion thereof inserted in the shaft hole 15a, and a sealing groove 20b, to which the sealing member 16b has been installed, on the intake passage 12 side thereof. Further, the valve shaft 8a has a sealing groove 20c, to which the sealing member 16c has been installed, in a portion thereof inserted in the shaft hole 15b.

The sealing member 16a is installed in the sealing groove 20a with the A-direction facing toward the throttle lever 17. The sealing member 16b is installed in the sealing groove 20b with the A-direction facing toward the intake passage 12. The sealing member 16c is installed in the sealing groove 20c with the A-direction facing toward the intake passage 12.

The shaft holes 15a and 15b have rotational sliding surfaces 21a and 21b, which slidably and rotatably support the valve shaft 8a. The valve shaft 8a has sliding cylindrical sections 22a and 22b, which slidably rotate with respect to the rotational sliding surfaces 21a and 21b, respectively. The surfaces of the sliding cylindrical sections 22a and 22b are provided with low-friction coating that uses a Teflon (registered trademark) resin or the like to reduce the friction against the rotational sliding surfaces 21a and 21b.

The gap between the rotational sliding surface 21a and the sliding cylindrical section 22a is airtightly sealed by the sealing members 16a and 16b positioned on both sides of the rotational sliding surface 21a and the sliding cylindrical section 22a.

Provided on the opposite side horn the throttle lever 17 of the throttle body 13 are a throttle sensor 23, which detects the degree of opening of the throttle valve 14, an intake air temperature sensor 24, which detects the temperature of intake air on an upstream side from the throttle valve 14, and a control block 25, to which the detection signals are input from the throttle sensor 23 and the intake air temperature sensor 24.

The gap between the rotational sliding surface 21b and the sliding cylindrical section 22b is airtightly sealed by the sealing member 16c installed on the intake passage 12 side, and an O-ring 26 provided between the throttle body 13 and the control block 25.

To insert the valve shaft 8a in the shaft holes 15a and 15b in order to assemble the valve shaft 8a and the sealing members 16a to 16c to the throttle body 13, the sealing members 16a to 16c are installed in the sealing grooves 20a to 20*c*, respectively, of the valve shaft 8*a*, and the valve shaft 8*a* is inserted in a C-direction from the shaft hole 15*b* to the shaft hole 15*a*.

At this time, the direction in which the valve shaft 8*a* moves (i.e. the C-direction) with respect to the sealing member 16*a* and 16*c* coincides with the A-direction (refer to FIG. 2) in both cases of the sealing members 16*a* and 16*c*. Nevertheless, as described above, the outer cylindrical sections 5 of the sealing members 16*a* and 16*c* will not interfere with the end portions of the shaft holes 15*a* and 15*b* to hamper the insertion, and the extended cylindrical portion 7 of the outer cylindrical section 5 will satisfactorily slide in the shaft holes 15*a* and 15*b*.

Further, regarding the sealing member 16*b*, the moving direction of the valve shaft 8*a* (i.e. the C-direction) coincides with the opposite direction from the A-direction (refer to FIG. 2). Hence, the valve shaft 8*a* is smoothly inserted, thus making it easy to install the valve shaft 8*a* and the sealing members 16*a* to 16*c*.

While the air intake controller 11 is in operation, intake air to be supplied to an engine is passed through the intake passage 12. The amount of the intake air is regulated by the throttle valve 14, which rotates integrally with the valve shaft 8*a*, according to the manipulated variable of the throttle grip. During the operation, the portions of the valve shaft 8*a* that are positioned in the shaft holes 15*a* and 15*b* are supported by the shaft holes 15*a* and 15*b* through the intermediary of the rotational sliding surface 21*a* and the sliding cylindrical section 22*a* and the rotational sliding surface 21*b* and the sliding cylindrical section 22*b* such that the portions can be smoothly rotated.

Further, during the operation, the pressure in the intake passage 12 is normally lower than the atmospheric pressure outside the throttle body 13, so that dust in the outside of the throttle body 13 may enter into the gap between the valve shaft 8*a* and the shaft holes 15*a* and 15*b*. In addition, if the pressure in the intake passage 12 becomes higher than the atmospheric pressure outside the throttle body 13, then the carbon particles fed to the intake passage 12 may enter into the gap between the valve shaft 8*a* and the shaft holes 15*a* and 15*b* due to the blowback from the engine.

Further, the valve shaft 8*a* is subjected to a high load in a direction that is orthogonal to the valve shaft 8*a* because of the throttle lever 17 being pulled by the wire 18 when the throttle grip is operated. Therefore, the entry of dust or carbon particles into the gap between the valve shaft 8*a* and the shaft hole 15*a* is likely to adversely affect the smooth rotation of the valve shaft 8*a*. For this reason, hermetically sealing the gap between the valve shaft 8*a* and the shaft hole 15*a* is extremely important. The same applies to the case where the throttle lever 17 is driven by an actuator, such as a motor, because vibrations or impacts are applied to the throttle lever 17.

In this respect, according to the present embodiment, the sealing members 16*a* to 16*c* and the O-ring 26 effectively prevent the entry of dust or carbon particles into the gap between the valve shaft 8*a* and the shaft holes 15*a* and 15*b*, as described above, and especially the gap between the rotational sliding surfaces 21*a* and 21*b* of the shaft holes 15*a* and 15*b* and the sliding cylindrical sections 22*a* and 22*b* of the valve shaft 8*a*.

More specifically, if the pressure in the intake passage 12 is lower than the atmospheric pressure outside the throttle body 13, then the pressure applied to the sealing member 16*a* is higher in the opposite direction than in the A-direction. This causes the gap between the gradually-decreasing-diameter portion 2 and the gradually-increasing-diameter portion 4 of the sealing member 16*a* to be pushed to increase, thus causing the gradually-decreasing-diameter portion 2 and the gradually-increasing-diameter portion 4 to come in closer contact with the bottom surface of the sealing groove 20*a* and the inner peripheral surface of the shaft hole 15*a*, respectively, of the valve shaft 8*a*.

Thus, the sealing of the gap between the rotational sliding surface 21*a* and the sliding cylindrical section 22*a* with respect to the outside of the controller is further enhanced. Accordingly, the entry of dust outside the controller into the gap between the valve shaft 8*a* and the shaft hole 15*a*, especially the gap between the rotational sliding surface 21*a* and the sliding cylindrical section 22*a*, is effectively prevented.

Meanwhile, if the pressure in the intake passage 12 is higher than the atmospheric pressure outside the controller, then the pressure applied in the opposite direction from the pressure applied in the A-direction to the sealing member 16*b* is higher. Therefore, the gap between the gradually-decreasing-diameter portion 2 and the gradually-increasing-diameter portion 4 of the sealing member 16*b* will be pushed to increase, thus causing the gradually-decreasing-diameter portion 2 and the gradually-increasing-diameter portion 4 to come in closer contact with the bottom surface of the sealing groove 20*b* and the inner peripheral surface of the shaft hole 15*a*, respectively, of the valve shaft 8*a*.

Thus, the sealing of the gap between the rotational sliding surface 21*a* and the sliding cylindrical section 22*a* with respect to the intake passage 12 is further enhanced. Accordingly, the entry of carbon particles or the like in the intake passage 12 into the gap between the valve shaft 8*a* and the shaft hole 15*a*, especially the gap between the rotational sliding surface 21*a* and the sliding cylindrical section 22*a*, is effectively prevented.

In the same manner, the sealing of the gap between the rotational sliding surface 21*b* and the sliding cylindrical section 22*b* with respect to the intake passage 12 is further enhanced by the sealing member 16*c* when the pressure in the intake passage 12 is higher than the atmospheric pressure outside the controller. Accordingly, the entry of carbon particles or the like in the intake passage 12 into the gap between the valve shaft 8*a* and the shaft hole 15*b*, especially the gap between the rotational sliding surface 21*b* and the sliding cylindrical section 22*b*, is effectively prevented.

When the pressure in the intake passage 12 is lower than the atmospheric pressure outside the controller, the entry of dust into the gap between the valve shaft 8*a* and the shaft hole 15*b* is blocked by the O-ring 26, which seals the gap between the control block 25 and the throttle body 13.

Figure 4:
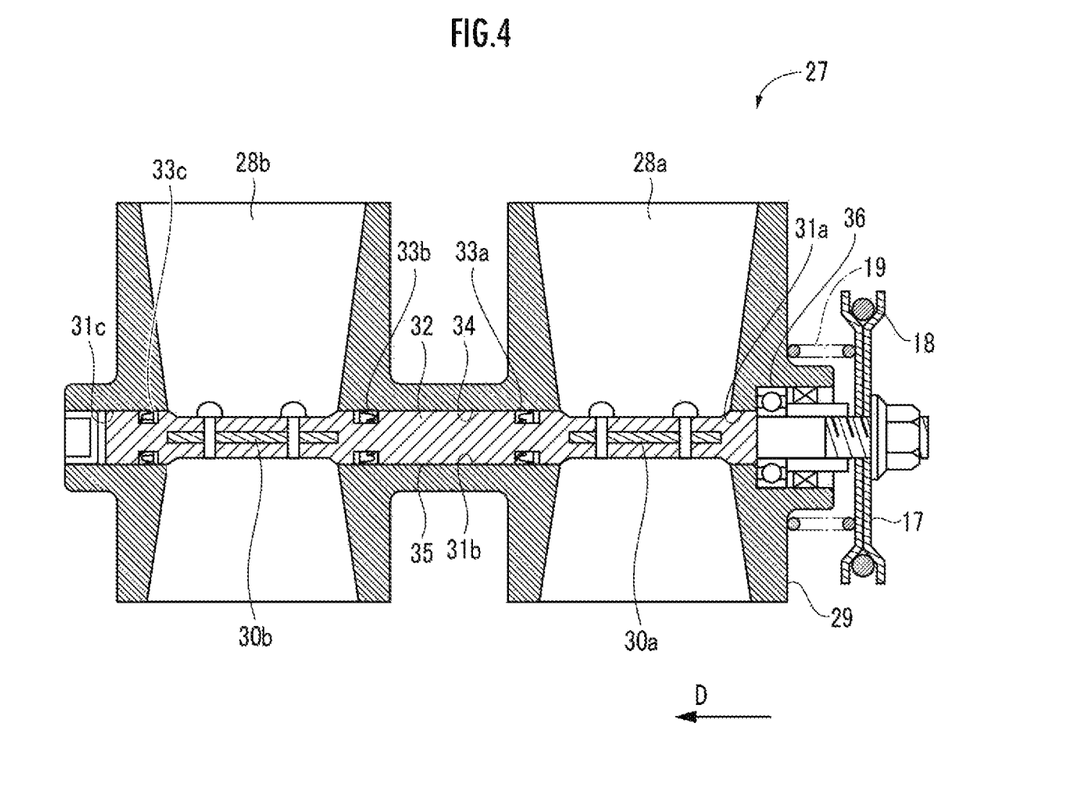
FIG. 4 is a sectional view of another air intake controller to which the sealing member in FIG. 1 has been installed.

FIG. 4 illustrates an example in which the sealing member 1 in FIG. 1 has been applied to another air intake controller. In FIG. 4, like reference numerals as those in FIG. 3 denote like elements.

Referring to FIG. 4, an air intake controller 27 includes a throttle body 29 serving as the main body having two intake passages 28*a* and 28*b* formed therein, throttle valves 30*a* and 30*b* for opening/closing the intake passages 28*a* and 28*b*, respectively, a valve shaft 32, which is rotatably supported by three shaft holes 31*a* to 31*c* provided in the throttle body 29 and to which the throttle valves 30*a* and 30*b* are fixed, sealing members 33*a* and 33*b*, which airtightly seal the gap between the shaft hole 31*b* and the valve shaft 32, and a sealing member 33*c*, which airtightly seals the gap between the shaft hole 31*c* and the valve shaft 32.

In this case, for example, the sealing member 1 illustrated in FIG. 1 can be applied to at least one of the sealing members 33*a* and 33*b*. In the example illustrated in FIG. 4, the sealing member 1 in FIG. 1 has been used for both of the sealing members 33a and 33b on both sides of the shaft hole 31b. Alternatively, however, whether the sealing member 1 is to be used for the sealing member 33a or 33b may be determined according to the insertion direction of the valve shaft 32 and required sealing directivity.

As illustrated in FIG. 4, if the valve shaft 32 is inserted in a D-direction, then the sealing member 1 in FIG. 1 is used for, for example, the sealing member 33b adjacent to the intake passage 28b of the shaft hole 31b such that the A-direction coincides with the D-direction. This makes it possible to insert the valve shaft 32 with no interference and also to prevent carbon particles from entering into the shaft hole 31b from the intake passage 28b.

In this case, the same sealing member as the sealing member 16b without the foregoing extended cylindrical portion 7 in FIG. 3 can be used for the sealing member 33a adjacent to the intake passage 28a of the shaft hole 31b and the sealing member 33c of the shaft hole 31c such that the D-direction coincides with the opposite direction from the A-direction.

Further, regarding the shaft hole 31a, the valve shaft 32 is supported by a ball bearing 36, so that a sealing member that is suited for supporting is used. The shaft hole 31b is provided with a rotational sliding surface 34, and the valve shaft 32 is provided with a sliding cylindrical section 35, which slidably rotates with respect to the rotational sliding surface 34. Other operational advantages are the same as with the case of the air intake controller 11 illustrated in FIG. 3.

As described above, according to the present embodiment, the use of the sealing member 1 illustrated in FIG. 1 makes it possible to achieve a high level of sealing with respect to the opposite direction from the A-direction regardless of the orientation of installation of the sealing member 1 to the shaft 8 or the valve shaft 8a or 32. The sealing member 1 will not interfere with the insertion of the shaft 8 or the valve shaft 8a or 32 into the shaft holes 10, 15a and 15b, or 31a to 31c.

In particular, if the minimum outer diameter of the extended cylindrical portion 7 of the sealing member 1 is smaller than the inner diameters of the shaft holes 10, 15a and 15b, or 31a to 31c, then the shaft 8 or the valve shaft 8a or 32 can be more easily inserted in the shaft holes 10, 15a and 15b, or 31a to 31c.

Further, regarding the valve shaft 8a or 32, both sides of the gap between the rotational sliding surfaces 21a and 21b or 34 of the shaft holes 15a and 15b or 31b and the sliding cylindrical sections 22a and 22b or 35 are sealed by the sealing members, and at least one side thereof is sealed by the sealing member 1 illustrated in FIG. 1. This arrangement enables the sealing members to be installed in directions that make it possible to effectively block dust from entering from outside the controller or carbon particles from entering from the intake passages 12 or 28a and 28b into the gaps between the rotational sliding surfaces 21a and 21b or 34 and the sliding cylindrical sections 22a and 22b or 35.

The above has described an embodiment of the present invention; however, the present invention is not limited thereto. For example, if the shaft hole 15b is also a communication hole in communication with the outside of the throttle body 13, then a plurality of the same sealing members as the sealing member 1 illustrated in FIG. 1 may be provided between the shaft hole 15b and the valve shaft 8a.

What is claimed is:

1. A sealing member which is installed in a sealing groove provided in an outer periphery of a shaft and which airtightly seals a gap between the shaft inserted in a shaft hole and the shaft hole, the sealing member including:
   an inner cylindrical section having a gradually-decreasing-diameter portion which has a diameter that gradually decreases in one direction;
   an outer cylindrical section having a gradually-increasing-diameter portion which has a diameter that gradually increases in the one direction; and
   an annular connecting section which interconnects the inner cylindrical section and the outer cylindrical section at end portions thereof on an opposite direction side from the one direction,
   wherein the outer cylindrical section includes an extended cylindrical portion which extends in the one direction from an end of the gradually-increasing-diameter portion on the one direction side, and
   an outer diameter of the extended cylindrical portion gradually decreases in the one direction,
   a length in the one direction of the gradually-decreasing-diameter portion is greater than a thickness in the one direction of the annular connecting section,
   a length in the one direction of the extended cylindrical portion is greater than the length in the one direction of the gradually-decreasing-diameter portion, and
   a total length in the one direction of the outer cylindrical section including the extended cylindrical portion is greater than a length in the one direction of the inner cylindrical section.

2. An air intake controller that controls an air intake of an internal combustion engine, comprising:
   a main body having an intake passage formed therein;
   a throttle valve for opening/closing the intake passage;
   a valve shaft which is rotatably supported by two shaft holes provided in the main body and to which the throttle valve is fixed; and
   a sealing member which is installed in a sealing groove provided in an outer periphery of the valve shaft and airtightly seals a gap between at least one of the two shaft holes and the valve shaft,
   wherein the sealing member includes:
      an inner cylindrical section having a gradually-decreasing-diameter portion which has a diameter that gradually decreases in one direction;
      an outer cylindrical section having a gradually-increasing-diameter portion which has a diameter that gradually increases in the one direction; and
      an annular connecting section which interconnects the inner cylindrical section and the outer cylindrical section at end portions thereof on an opposite direction side from the one direction,
   the outer cylindrical section includes an extended cylindrical portion which extends in the one direction from an end of the gradually-increasing-diameter portion on the one direction side, and
   an outer diameter of the extended cylindrical portion gradually decreases in the one direction,
   a length in the one direction of the gradually-decreasing-diameter portion is greater than a thickness in the one direction of the annular connecting section,
   a length in the one direction of the extended cylindrical portion is greater than the length in the one direction of the gradually-decreasing-diameter portion, and a total length in the one direction of the outer cylindrical section including the extended cylindrical portion is greater than a length in the one direction of the inner cylindrical section.

3. The air intake controller according to claim 2, wherein at least one of the two shaft holes has a sliding surface that slidably and rotatably supports and directly contacts the valve shaft, the valve shaft has a sliding cylindrical section that slidably rotates with respect to the sliding surface, and a gap between the sliding surface and the sliding cylindrical section is airtightly sealed at opposed longitudinal ends, at least one of the opposed longitudinal ends, and another one of the opposed longitudinal ends being sealed by a second sealing member which is installed in a second sealing groove provided in an outer periphery of the valve shaft;

the second sealing member includes:
- an inner cylindrical section having a gradually-decreasing-diameter portion which has a diameter that gradually decreases in the other direction;
- an outer cylindrical section having a gradually-increasing-diameter portion which has a diameter that gradually increases in the other direction; and
- an annular connection section which interconnects the inner cylindrical section and the outer cylindrical section at end portions thereof on an opposite direction side from the other direction.

\* \* \* \* \*